United States Patent [19]
Lightfoot et al.

[11] Patent Number: 5,572,326
[45] Date of Patent: Nov. 5, 1996

[54] ARRANGEMENTS FOR MEASURING THE HEIGHT OF A LAYER OF FLOATING LIQUID

[76] Inventors: John A. Lightfoot, 5 Beck Close, Beckermet, Cumbria, United Kingdom, CA21 2YH; Richard Smith, 38 Windermere Ave., Clinkham Wood, St Helens, Merseyside, United Kingdom, FY6 7HQ; Joseph W. Spencer, Dept. of Electrical Engineering & Electronics, Brownlow Hill, PO Box 147, Liverpool, United Kingdom, L69 3BX

[21] Appl. No.: 149,831

[22] Filed: Nov. 10, 1993

[30] Foreign Application Priority Data

Nov. 10, 1992 [GB] United Kingdom .................. 9223574

[51] Int. Cl.⁶ ............................................ C01N 21/59
[52] U.S. Cl. .................................... 356/436; 356/442
[58] Field of Search ................................. 356/436, 441, 356/442; 250/577

[56] References Cited

U.S. PATENT DOCUMENTS

| | | | |
|---|---|---|---|
| 3,734,629 | 5/1973 | Griffiths et al. | 356/441 |
| 4,119,860 | 10/1978 | Gooley | 250/577 |
| 5,164,608 | 11/1992 | Vali et al. | 250/577 |

FOREIGN PATENT DOCUMENTS

| | | |
|---|---|---|
| 56-155815 | 12/1981 | Japan . |
| 58-019512 | 2/1983 | Japan . |
| 58-150828 | 9/1983 | Japan . |
| 5215590 | 8/1993 | Japan . |
| WO92/09749 | 6/1992 | WIPO . |

*Primary Examiner*—Richard A. Rosenberger
*Attorney, Agent, or Firm*—Nixon & Vanderhye P.C.

[57] ABSTRACT

An arrangement for the measurement of the height of a layer of a first liquid floating on a second liquid which comprises projection means for projecting a beam of optical radiation along an inspection path which is horizontal when the arrangement is in use, detector means for detecting radiation of the said beam after transmission along the inspection path, means for providing relative displacement in a direction which is vertical when the arrangement is in use between the said layer and the said inspection path whereby the said layer traverses the inspection path, the detector means being capable of observing the upper and lower surfaces of the said layer by detecting changes in an optical transmission property of the said beam occurring at the said surfaces and means for measuring the said relative displacement between the locations of the observed upper and lower surfaces.

14 Claims, 3 Drawing Sheets

ARRANGEMENTS FOR MEASURING THE HEIGHT OF A LAYER OF FLOATING LIQUID

BACKGROUND OF THE INVENTION

1. Field of the Invention

The present invention relates to arrangements for measuring the height of a layer of floating liquid, especially the height of a layer of a first liquid floating on a second liquid.

2. Discussion of Prior Art

In certain industrial applications it is necessary to detect by measuring the height of a layer of an organic liquid on the surface of an aqueous layer. If the organic liquid is flammable it is hazardous to use electronic means to measure the height since the possibility of sparks can lead to fire or explosions.

SUMMARY OF THE INVENTION

According to the present invention there is provided an arrangement for the measurement of the height of a layer of a first liquid floating on a second liquid which comprises projection means for projecting a beam of optical radiation along an inspection path which is horizontal when the arrangement is in use, detector means for detecting radiation of the said been after transmission along the inspection path, means for providing relative displacement in a direction which is vertical when the arrangement is in use between the said layer and the said inspection path whereby the said layer traverses the inspection path, the detector means being capable of observing the upper and lower surfaces of the said layer by detecting changes in an optical transmission property of the said beam occurring at the said surfaces and means for measuring the said relative displacement between the locations of the observed upper and lower surfaces.

In a preferred form of the present invention the arrangement may further comprise an inverted funnel having an upwardly extending neck or channel which is narrow compared with the average diameter or dimensions of the vessel containing the body of liquid to be inspected. The said projection means and detector means may be located facing one another on opposite sides of the tubular channel, which is desirably made of transparent material, eg glass, whereby liquid in the channel may be arranged to traverse the inspection path between the projection and detector means. The projection means and detector means may be affixed to the sides of the tubular channel on the outside wall thereof. The base or mouth of the funnel may be lowered into a vessel, eg tank, containing a body of a liquid to be investigated and liquid in the vessel is displaced upward into the said channel. A first liquid floating on the surface of a second liquid in the vessel is thereby displaced upward into the channel and the upper and lower surfaces of the layer of the first liquid traverse the inspection path. In this form the height of the floating layer of the first liquid is magnified in the channel and thereby made easier to measure. The height can be calculated from the measured distance moved vertically downward by the funnel to cause the upper and lower surfaces of the said layer respectively to traverse the said inspection path across the channel and the height amplification at the inspection path provided by the shape of the funnel and diameter of the channel.

The said funnel carrying the projection means and detector means may be raised and lowered by a precisely controlled actuator. The actuator may for example be computer controlled and the distance moved by the funnel to cause the upper and lower surfaces of the said layer to traverse the inspection path may be recorded in the computer. The height of the layer in the vessel may thereby be calculated from the known amplification factor and displayed by the computer.

The arrangement according to the present invention is especially suitable for measuring safely the thickness of organic liquids, especially flammable organic liquids such as kerosene, floating on the surface of an aqueous solution, eg water by detecting the upper and lower surfaces of the layer optically.

The optical transmission property observed by the detector means may be the dominant wavelength or chromaticity of a beam of white light transmitted from the projection means along the inspection path. There are significant changes in the transmitted chromaticity at the surfaces between air and the first liquid and between the first liquid and the second liquid and observation of such changes provides an accurate way of detecting the said surfaces. Such surfaces may not be easy to detect by other methods, eg manual observation.

We have found that by adding a colouring agent, eg a coloured salt such as a ferric salt to an aqueous solution to be inspected the detection of the surfaces of an organic layer floating on the solution is enhanced by increasing the shift in the chromaticity of the radiation detected by the said detector means.

The said projection means may in the said preferred form comprise one or more optical fibres and a white light source at one end of the fibre(s) the other end of the fibre(s) being arranged on the outside wall of the tube to project the light into the channel thereof. Likewise, the detection means may comprise one or more optical fibres arranged on the opposite side of the tube to pick up light emerging from the inside of the tube, the fibre(s) having at their other end one or more chromaticity detectors. Detection may be carried out by use of a number of photodetectors, say N of them, each with a different spectral responsivity (call these $R_1(\lambda) \ldots R_N(\lambda)$). Each of these detectors receives the same light signal, eg from different optical fibres. Then it is possible to derive (N−1) independent chromatic co-ordinates. The co-ordinates describe chromaticity of the detected light signal. The chromatic co-ordinates $X_m (m=1 \ldots N)$ are defined as $$X_m = \frac{\int I(\lambda) R_m(\lambda) d\lambda}{\sum_{m=1}^{N} \int I(\lambda) R_m(\lambda) d\lambda}$$

where $$\sum_{m=1}^{N} X_m = 1 \quad \text{and} \quad 0 \leq X_m \leq 1$$

and $I(\lambda)$ is the intensity over a range of wavelengths. The use of two photodetectors gives one independent variable. It can be arranged so that this variable has a one to one relationship with a weighted mean wavelength of the light signal. This wavelength is known as the dominant wavelength, and can be calculated using knowledge of $R_1(\lambda)$ and $R_2(\lambda)$. The calculation may be carried out using a computer which may be the same computer as referred to hereinbefore.

BRIEF DISCUSSION OF THE DRAWINGS

Embodiments of the present invention will now be described by way of example with reference to the accompanying drawings, in which.

DETAILED DISCUSSION OF PREFERRED EMBODIMENTS

Figure 1:
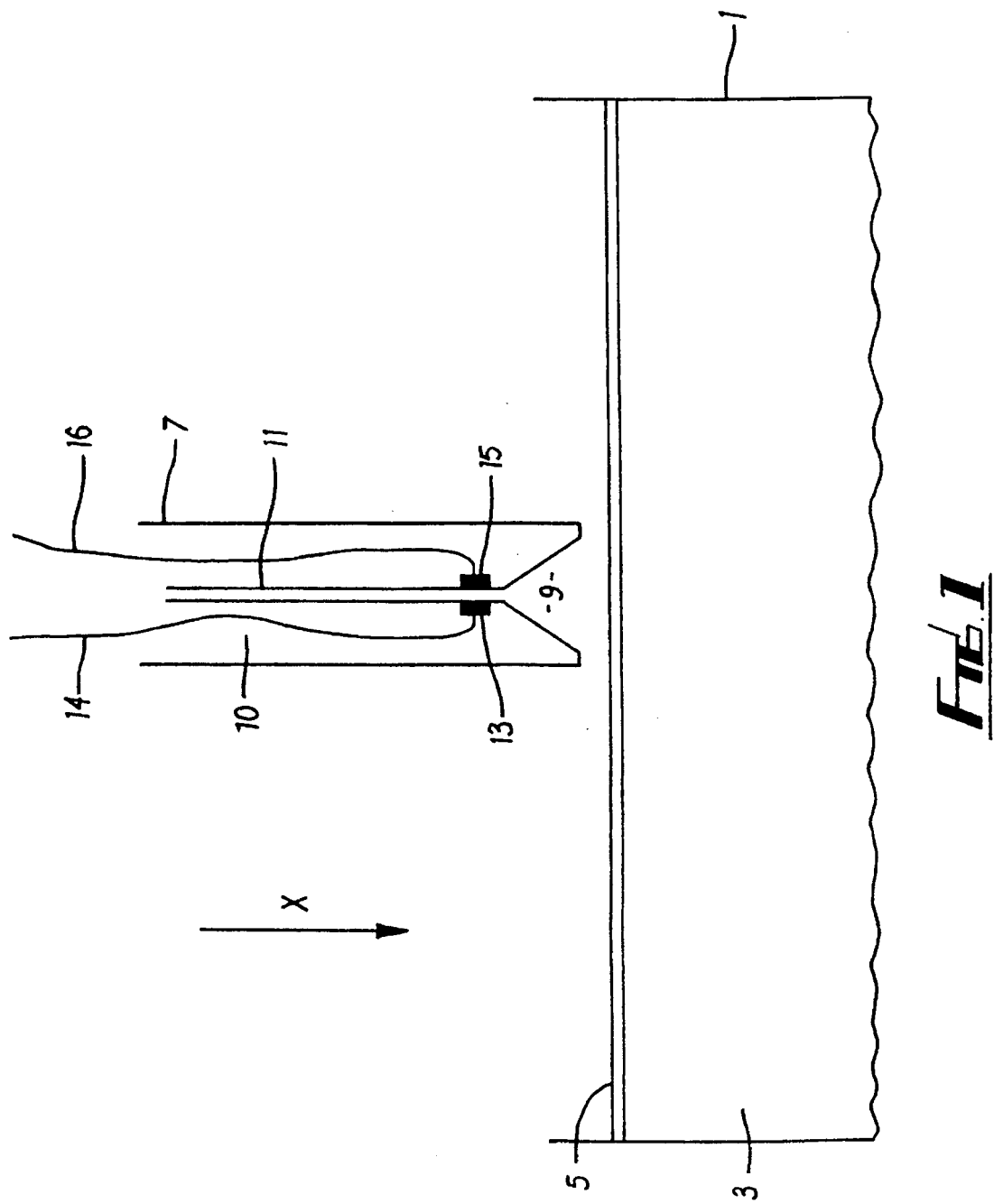
FIG. 1 is a partly schematic cross-sectional side elevation of a detection arrangement.

As shown in FIG. 1 a tank 1 contains a quantity of water 3 having a layer 5 of kerosene on its surface. The thickness t of the layer 5 is measured as follows. A housing 7 having at its lower end an inverted funnel shaped cavity 9 leading into an upwardly extending neck 11 is lowered into the liquid comprising the water 3 and layer 5 of kerosene. The housing 7 has an enclosed cavity 10 in which a circular fibre holding collar 13 is fitted around the outside wall of the neck 11. A bundle 14 of optical fibres leads from a white light source (not shown) to the collar 13. Likewise, a bundle 16 of optical fibres, fixed to the collar 13 opposite to bundle 14 conveys optical radiation to an analyser (not shown). In practice the transmitter bundle 14 of optical fibres and receptor bundle 16 of optical fibres may include simple rings holding the ends of their fibres together. A light beam inspection path is thereby defined in the neck 11 between the transmitter bundle 14 of optical fibres the receptor bundle 16 of optical fibres. A computer controlling the movement of the housing 7 records the distance moved by the housing 7 between positions corresponding respectively to the upper and lower surfaces of the kerosene displaced into the neck 11 being level with the light transmitter 13 and receptor 15.

The chromaticity of light detected by the receptor 15 is measured by the analyser as kerosene from the layer 5 is displaced along the neck 11. Where step changes in chromaticity occur these are indicated to the computer. From the measured distance moved by the housing 7 the height of the layer 5 is calculated by the computer.

Figure 2:
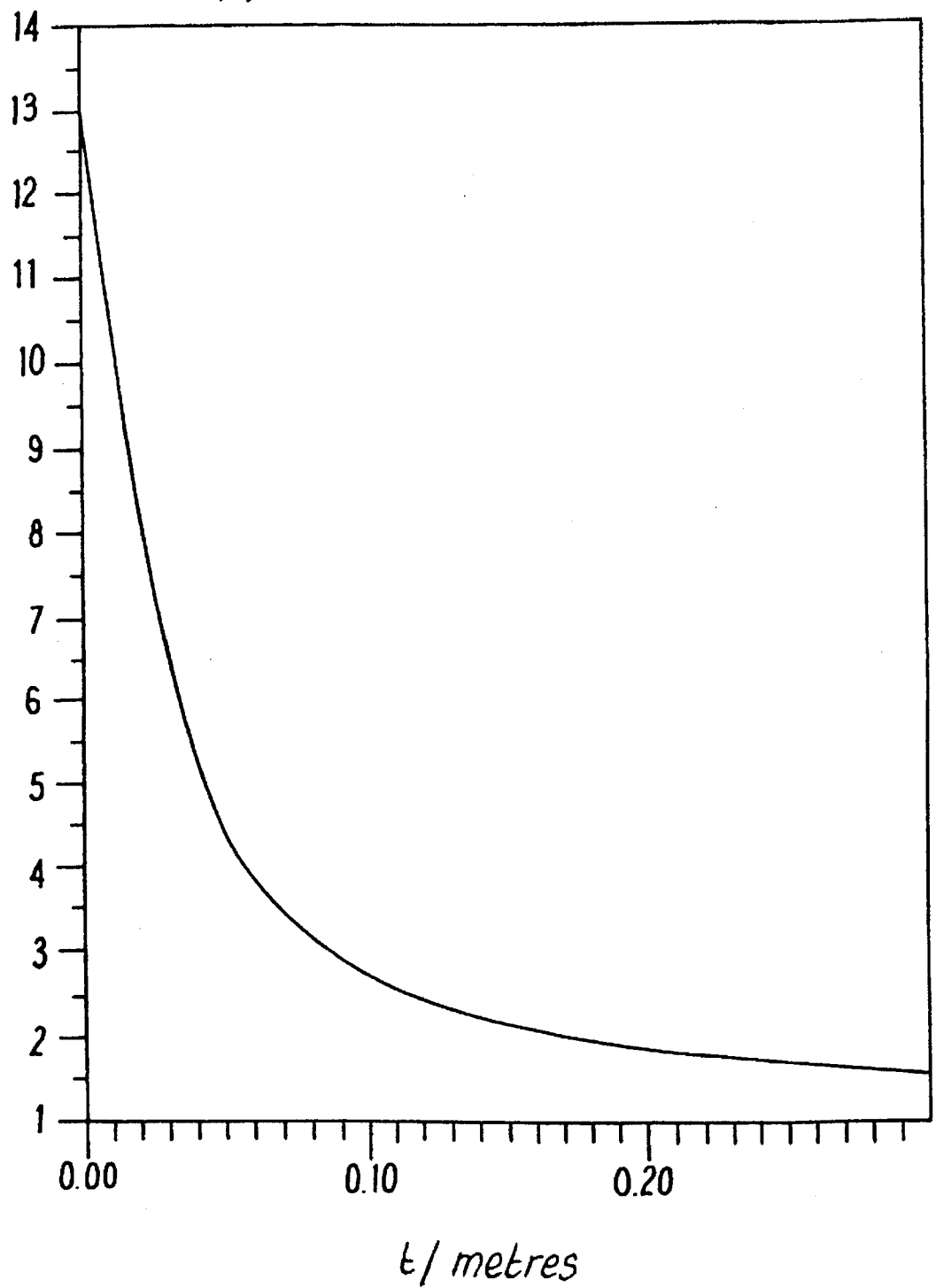
FIG. 2 is a graph of amplification factor of the height of a layer of liquid measured versus the layer thickness using the arrangement shown in FIG. 1.

FIG. 2 gives an example of amplification factor A(t) obtained for the housing 1 as a function of thickness t of the layer 5 in the tank 1. The amplification factor is the ratio of the height of kerosene layer as measured in the neck 11 to the actual thickness t of the layer 5 in the tank 1. The actual thickness t is calculated from the measured height by the computer using a graphical relationship such as that shown in FIG. 2.

Figure 3:
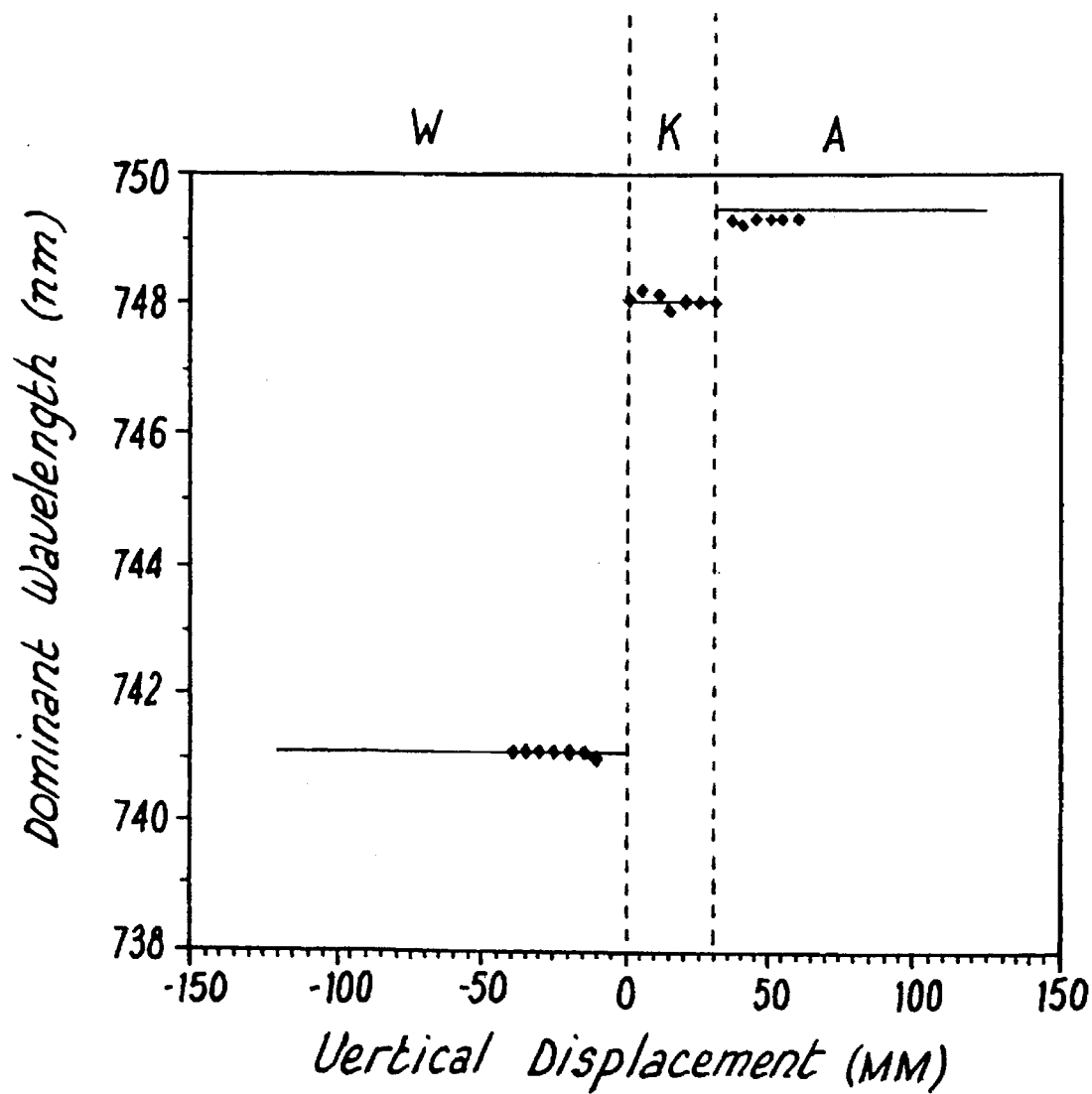
FIG. 3 is a graph of detected dominant wavelength versus vertical displacement distance obtained using the arrangement shown in FIG. 1

FIG. 3 illustrates the step changes which occur in chromaticity of the detected light. The results shown in FIG. 3 were plotted for a kerosene layer 5 of nominal thickness 2.5 mm. Vertical displacement was measured to relative to (ie zero at) the kerosene/water interface. The solid lines in the graph represent theoretical response and the experimental points adjacent thereto represent experimentally measured dominant wavelength as a function of displacement. In FIG. 3 the region to the left of the dashed lines indicated by W at the top of the graph represents water, the region between the dashed lines indicated by K represents kerosene and the region to the right of the dashed lines indicated by A represent air. Interpretation of the data shown graphically in FIG. 3 by the graphical relationship of FIG. 2 gave a kerosene layer thickness of 2.4 mm.

The measurement technique described shows (FIG. 3) dominant wavelength changes of approximately 7 nm and 1.5 nm (FIG. 3) at the lower and upper surfaces of the kerosene layer. The resolution of the detection arrangement is about 0.1 nm, which gives a possible error of 1 part in 15. The approximate performance of the chromatic detection system illustrated in FIG. 1 is tabulated below.

| | |
|---|---|
| Dynamic Range | 507–1021 nm |
| Resolution | 0.1 nm |
| Accuracy | ±0.1 nm |
| Stability | 0.45 nm drift over 120 hours (worst case) |

As noted above, performance can be improved by adding a colouring agent to the water 3 in the tank 1.

We claim:

1. An apparatus for the measurement of the height of a layer of a first liquid floating on a second liquid, said apparatus comprises:

projection means for projecting a beam of optical radiation along an inspection path which is horizontal when the arrangement is in use;

detector means for detecting radiation of the said beam after transmission along the inspection path, means for providing relative displacement in a direction which is vertical when the arrangement is in use between said layer and said inspection path whereby said layer traverses the inspection path, the detector means being capable of observing the upper and lower surfaces of said layer by detecting changes in an optical transmission property of said beam occurring at said surfaces, wherein the optical transmission property observed by the detector means is the dominant wavelength or chromaticity of a beam of white light transmitted from the projection means along the inspection path; and means for measuring said relative displacement between the locations of the observed upper and lower surfaces.

2. An apparatus as in claim 1 and further comprising an inverted funnel having an upwardly extending channel which is narrow compared with the average diameter of the vessel containing the body of liquid to be inspected.

3. An apparatus as in claim 2 wherein said projection means and detector means are located facing one another on opposite sides of the channel which is made of transparent material, whereby liquid in the channel may be arranged to traverse the inspection path between the projection and detector means.

4. An apparatus as in claim 3 wherein the projection means and detector means are affixed to the sides of the channel on the outside wall thereof.

5. An apparatus as in claim 2 wherein a mouth of the funnel is lowered into a vessel containing a body of a liquid to be investigated and liquid in the vessel is displaced upward into the said channel, whereby a first liquid floating on the surface of a second liquid in the vessel is displaced upward into the channel and the upper and lower surfaces of the layer of the first liquid traverse the inspection path, so that the height of the floating layer of the first liquid is magnified in the channel.

6. An apparatus as in claim 2 wherein said projection means comprises at least one optical fibre and a white light source at one end of the at least one fibre, the other end of the at least one fibre being arranged on the outside wall of the channel to project the light into the neck or channel.

7. An apparatus as claimed in claim 6 wherein the detection means comprises at least one optical fibre arranged on the opposite side of the channel from the end of the at least one fibre projecting light into the channel to pick up light emerging from the inside of the channel, the at least one fibre of the detection means having at its other end at least one chromaticity detector.

8. A method for the measurement of the height of a layer of a first liquid floating on a second liquid, said method comprising the steps of:

passing a sample of the liquids along a sample channel past an inspection path extending across the sample channel;

projecting a beam of optical radiation along the inspection path;

detecting radiation of the beam after transmission along the inspection path;

detecting changes in the transmission of the beam corresponding to the top and bottom of the layer of the first liquid in the channel; and calculating the distance between the top and bottom of the layer wherein said detecting radiation step includes detecting the dominant wavelength or chromaticity of a beam of white light transmitted along the inspection path.

9. A method as in claim 8 wherein the channel is provided in an inverted funnel, the channel being upwardly extending and narrow compared with the average diameter of the vessel containing the body of liquid to be inspected.

10. A method as in claim 9 wherein said passing step includes lowering the funnel into a vessel containing a body of liquid to be investigated and liquid in the vessel is displaced upward into said channel, whereby a first liquid floating on the surface of a second liquid in the vessel is displaced upward into the channel and the upper and lower surfaces of the layer of the first liquid traverse the inspection path, so that the height of the floating layer of the first liquid is magnified in the channel.

11. A method as in claim 9 wherein said projecting step uses at least one optical fibre and a white light source at one end of the at least one fibre, the other end of the at least one fibre being arranged on the outside wall of the channel and projects the light into the channel.

12. A method as claimed in claim 11 wherein the detecting radiation step uses at least one optical fibre arranged on the opposite side of the channel from the end of the fibre projecting light into the channel to pick up light emerging from the inside of the channel, the at least one fibre in the detecting step passing said light to another end with at least one chromaticity detector.

13. A method as in claim 8 wherein liquid in the channel traverses the inspection path.

14. A method as in claim 13 wherein the inspection path traverses the sides of the channel on the outside wall thereof.

* * * * *

UNITED STATES PATENT AND TRADEMARK OFFICE
CERTIFICATE OF CORRECTION

PATENT NO. : 5,572,326
DATED : November 5, 1996
INVENTOR(S) : LIGHTFOOT et al.

It is certified that error appears in the above-indentified patent and that said Letters Patent is hereby corrected as shown below:

Column 1, line 28, change "been" to --beam--.

Column 2, line 42, change "The" to --These--; and

Column 3, line 29, after "fibres" insert --and--.

Signed and Sealed this

Twenty-seventh Day of May, 1997

Attest:

BRUCE LEHMAN

*Attesting Officer*  *Commissioner of Patents and Trademarks*